United States Patent
Schrage et al.

(10) Patent No.: US 9,416,028 B2
(45) Date of Patent: Aug. 16, 2016

(54) ADSORBENT PRECIPITATED ON A CARRIER, METHOD FOR PRODUCING SAID ADSORBENT, AND USE OF SAID ADSORBENT

(75) Inventors: Christian Schrage, Dresden (DE); Jann-Michael Giebelhausen, Rathenow (DE); Sven Fichtner, Premnitz (DE)

(73) Assignee: BLÜCHER GMBH, Erkrath (DE)

( * ) Notice: Subject to any disclaimer, the term of this patent is extended or adjusted under 35 U.S.C. 154(b) by 261 days.

(21) Appl. No.: 14/239,167

(22) PCT Filed: Aug. 2, 2012

(86) PCT No.: PCT/EP2012/065166
§ 371 (c)(1),
(2), (4) Date: Feb. 17, 2014

(87) PCT Pub. No.: WO2013/023932
PCT Pub. Date: Feb. 21, 2013

(65) Prior Publication Data
US 2014/0151305 A1 Jun. 5, 2014

(30) Foreign Application Priority Data
Aug. 17, 2011 (DE) .......................... 10 2011 081 080

(51) Int. Cl.
| | | |
|---|---|---|
| C02F 1/28 | (2006.01) | |
| B05D 1/36 | (2006.01) | |
| B01J 20/04 | (2006.01) | |
| B01J 20/20 | (2006.01) | |
| B01J 20/28 | (2006.01) | |
| B01J 20/32 | (2006.01) | |
| G21F 9/12 | (2006.01) | |
| B01J 20/02 | (2006.01) | |
| B01J 20/30 | (2006.01) | |
| C02F 101/20 | (2006.01) | |

(52) U.S. Cl.
CPC ............... *C02F 1/281* (2013.01); *B01J 20/024* (2013.01); *B01J 20/0211* (2013.01); *B01J 20/0218* (2013.01); *B01J 20/0225* (2013.01); *B01J 20/0229* (2013.01); *B01J 20/0237* (2013.01); *B01J 20/0251* (2013.01); *B01J 20/0292* (2013.01); *B01J 20/04* (2013.01); *B01J 20/041* (2013.01); *B01J 20/20* (2013.01); *B01J 20/28019* (2013.01); *B01J 20/28066* (2013.01); *B01J 20/28069* (2013.01); *B01J 20/28078* (2013.01); *B01J 20/3071* (2013.01); *B01J 20/3204* (2013.01); *B01J 20/3236* (2013.01); *B05D 1/36* (2013.01); *C02F 1/288* (2013.01); *G21F 9/12* (2013.01); *C02F 2101/20* (2013.01)

(58) Field of Classification Search
CPC ............... B01J 20/04; B01J 20/28078; B01J 20/28066; B01J 20/3204; B01J 20/3236; B01J 20/0211; B01J 20/0218; B01J 20/0229; B01J 20/0292; B01J 20/28019; B01J 20/041; B01J 20/024; C02F 1/288; C02F 1/281; G21F 9/12; B05D 1/36
USPC .................................................. 502/416–419
See application file for complete search history.

(56) References Cited

U.S. PATENT DOCUMENTS

| | | | |
|---|---|---|---|
| 4,467,111 A * | 8/1984 | Puskas .................... | B01J 23/44 502/185 |
| 5,407,889 A * | 4/1995 | Remes .................... | G21F 9/12 502/400 |
| 6,046,131 A | 4/2000 | Tanihara | |
| 6,093,664 A | 7/2000 | White et al. | |
| 6,190,562 B1 | 2/2001 | Kulprathipanja et al. | |
| 6,214,234 B1 | 4/2001 | Harjula et al. | |
| 2008/0107589 A1* | 5/2008 | von Blucher .......... | A61K 33/44 423/449.1 |

FOREIGN PATENT DOCUMENTS

| | | |
|---|---|---|
| EP | 0311244 | 8/1988 |
| EP | 0575612 | 12/1991 |
| JP | H02-207839 | 8/1990 |
| JP | H05-164896 | 6/1993 |
| WO | 9750092 | 12/1997 |
| WO | 03072498 | 9/2003 |
| WO | 2005016819 | 2/2005 |

OTHER PUBLICATIONS

Feng et al., "Synthesis and characterization of a new activated carbon supported ammonium molybdophosphate composite and its cesium-selective adsorption properties", Radiochim. Acta, 98, Seiten 39 bis 244.
Wang et al., "Supporting of Potassium Copper Hexacyano-ferrate on Porous Acitvated Carbon Substrate for Cesiumseparation", Separation Science and Technology 44, 2009, Seiten 4023 bis 4035.
Terada et al., "Silical gel as a support for inorganic ion-exchangers for the determination of caesium-137 in natural waters", Talanta, 1970, vol. 17, Seiten 955 bis 963.
Krishna et al., "Effect of powder synthesis procedure on calcium site occupancies in barium—calcium—titanate, a Rietveld analysis", Applied Physics Letters, Nr. 3, 1993, Seiten 231 bis 233.

* cited by examiner

*Primary Examiner* — Daniel C McCracken
(74) *Attorney, Agent, or Firm* — Edward E. Sowers; Brannon Sowers & Cracraft PC

(57) ABSTRACT

The invention relates to an adsorbent precipitated on a carrier and to a method for producing said adsorbent. The carrier comprises a polymer-based spherical activated charcoal. The adsorbent comprises an inorganic precipitate capable of adsorbing a metal cation or a mixture of metal cations from a liquid, preferably aqueous, medium. The adsorbent precipitated on a carrier is used to remove, for example, $Cs^+$ from water containing $Cs^+$, in particular from water contaminated with radiotoxic $^{137}Cs^+$.

9 Claims, 2 Drawing Sheets

ADSORBENT PRECIPITATED ON A CARRIER, METHOD FOR PRODUCING SAID ADSORBENT, AND USE OF SAID ADSORBENT

CROSS-REFERENCES TO RELATED APPLICATIONS

This application is a National Stage filing of International Application PCT/EP 2012/065166, filed Aug. 2, 2012, claiming priority to German Application No. DE 10 2011 081 080.3 filed Aug. 17, 2011, entitled "ADSORBENT PRECIPITATED ON A CARRIER, METHOD FOR PRODUCING SAID ADSORBENT, AND USE OF SAID ADSORBENT". The subject application claims priority to PCT/EP 2012/065166, and to German Application No. DE 10 2011 081 080.3 and incorporates all by reference herein, in their entirety.

BACKGROUND OF THE INVENTION

The invention relates to an adsorbent precipitated on a carrier (support), a method of producing said adsorbent and a method of using said adsorbent.

It is known to use precipitates of hexacyanoferrate(II) and of hexacyanoferrate(III) to adsorb $Cs^+$, in particular radiotoxic $^{137}Cs^+$. The precipitates can be synthesized via a precipitation reaction of the corresponding starting compounds in an aqueous system. However, the precipitates come down in the form of finely crystalline or colloidal precipitates. Therefore, when the finely crystalline or colloidal precipitates are used in fixed-bed packing, high pressure drops ensue, which either reduces the through-flow rate of the $Cs^+$-polluted water or limits the size of the adsorber columns used.

DE 40 21 046 A1 describes a $Cs^+$-selective ion exchange material composed of diammoniumcopper hexacyanoferrate, which is deposited on a carrier consisting of a spherical porous anion exchanger based on polystyrene, wherein quaternary ammonium groups act as anion exchange groups. The quaternary ammonium groups bind the diammoniumcopper hexacyanoferrate deposited on the carrier. However, the swellability of the ion exchange material used as carrier has an adverse effect on the dimensional stability of an ion exchange material used as filter bed, since there is a volume expansion of the filter bed as a consequence of the swelling. As a result, mechanical stresses build up in a closed adsorptive apparatus, e.g., an adsorber column, and may damage the adsorptive apparatus. The abrasion resistance of the ion exchange carrier further decreases in the swollen state thereof and may result in carrier material being carried out of the adsorptive apparatus together with the $Cs^+$ deposited thereon, which is undesirable in relation to the removal of radiotoxic $^{137}Cs^+$ in particular. The carrier with its quaternary ammonium groups is a strong basic anion exchanger, so use of the carrier in an acidic medium gives rise to acid-base reactions which evolve heat which can reduce the $Cs^+$ adsorption capacity of the adsorbent deposited on the carrier.

U.S. Pat. No. 4,448,711 describes impregnating a zeolite with metal ions capable of adsorbing sparingly water-soluble ferrocyanides in the pores of a zeolite through ion exchange. Following adsorption of the aforementioned metal ions in the pores of the zeolite, the zeolite is treated with an aqueous solution of soluble ferrocyanide, thereby forming a metal ferrocyanide of the aforementioned metal ions on the zeolite. The zeolite is subsequently subjected to an aging treatment. The aging treatment is carried out by heating the zeolite to 100° C. in water or air in order to promote the crystallization of the metal ferrocyanide compound. Alternatively, the zeolite is dipped into a highly concentrated aqueous solution of a neutral alkali metal salt at preferably 80-100° C. in order to remove unconverted metal ions and age the metal ferrocyanide compound in the pores of the zeolite. The metal ferrocyanide deposited on the zeolite carrier is costly and inconvenient to make because of the aging treatment needed. Moreover, not all zeolites, i.e., compounds of the type $M_{2/z}O.Al_2O_3.xSiO_2.yH_2O$ (M=mono- or polyvalent metal, z=valence, x=1.8 to 12, y=0 to about 8), are stable in both acidic and alkaline solution, narrowing the pH spectrum of $Cs^+$-containing solutions which can be treated with the adsorbent deposited on the zeolite. Zeolites further tend to be produced in the form of a finely divided powder. When the zeolite powder is used in an adsorber column in the form of a fixed-bed packing, appreciable pressure drops ensue in the operation of the adsorber column. True, a granular zeolite could be produced from the pulverulent zeolite to reduce the pressure drops. Yet this would make the production of the zeolite-based carrier even more costly and inconvenient.

BRIEF SUMMARY OF THE INVENTION

The problem addressed by the present invention is therefore that of providing a carrier-adsorbed adsorbent, in particular a $Cs^+$ adsorbent, which
  has a high mechanical and chemical stability, and
  causes a very low pressure drop on usage in an adsorptive apparatus.

The problem is solved by an adsorbent precipitated on a carrier, characterized in that the carrier comprises a polymer-based spherical activated carbon and the adsorbent comprises an inorganic precipitate capable of adsorbing a metal cation or a mixture of metal cations from a liquid, preferably aqueous, medium.

In a preferred embodiment of the carrier-precipitated adsorbent of the present invention, the carrier consists of a polymer-based spherical activated carbon and the adsorbent is an inorganic precipitate capable of adsorbing a metal cation or a mixture of metal cations from a liquid, preferably aqueous, medium.

The carrier-precipitated adsorbent of the present invention has a high level of mechanical stability. This high mechanical stability manifests itself
  in a high compressive/bursting strength (weight-bearing capacity) per activated carbon spherule of not less than 5 newtons, preferably of not less than 10 newtons and generally in a range from 5 to 50 newtons, and also
  in an abrasion resistance of not less than 90% when measured by a test method modified by Applicant on the lines of the method of CEFIC (Conseil Européen des Federations des l'Industrie Chimique, November 1986, item 1.6 "Mechanical Hardness", pages 18/19) and described in EP 1 918 022 A1, paragraph [0046],
so an adsorption column operated with the carrier-precipitated adsorbent of the present invention does not form any carrier fragments nor any carrier dust, thereby preventing the drag-out of the metal cation adsorbed on the carrier or, as the case may be, the mixture of metal cations which is adsorbed by the carrier. This is advantageous, in particular in relation to the adsorption of radiotoxic metal cations, as with the adsorption of radiotoxic $^{137}Cs^+$ for example.

In preferred embodiments of the carrier-precipitated adsorbent of the present invention, the abrasion resistance is not less than 90%, more preferably not less than 95% and even more preferably 98%.

The high mechanical stability of the carrier-precipitated adsorbent of the present invention has the effect that the abrasion which occurs on operating an adsorption chromatography column packed with the carrier-precipitated adsorbent of the present invention is about 1.1 to 2.5 times less than the abrasion which occurs on operating an adsorption chromatography column of the same dimensions which is packed with an adsorbent whose carrier is a granular activated carbon which contains the same inorganic precipitate as the adsorbent of the present invention and which consists of granules whose mean diameter is equal to the diameter of the spherical polymer-based activated carbon used in the adsorbent of the present invention.

At the same time, the carrier-precipitated adsorbent of the present invention has a high chemical stability, so the pH spectrum of applicatory solutions of the metal cation, for example of $Cs^+$-containing solutions or of the mixture of metal cations extends not only far into the acidic region (down to pH 1, for example) but also far into the alkaline region (up to pH 12-13, for example), the chemical stability of the carrier-precipitated adsorbent according to the present invention being determined not by the carrier used according to the present invention but by the chemical stability of the precipitate.

Furthermore, when used in an adsorptive apparatus, the carrier-precipitated adsorbent of the present invention exhibits as a consequence of the spherical shape of the carrier the least possible pressure drop for a comparable particle size, while the pressure drop does not even increase during long filtration periods, since the aforementioned high mechanical stability on the part of the polymer-based spherical activated carbon prevents any fragmentation of the spherules and hence any plugging of the volumes between the carrier spherules by spherule fragments. The consequence is that a pressure drop which occurs on operating an adsorption chromatography column packed with the carrier-precipitated adsorbent of the present invention is about 1.1 to 2 times less than the pressure drop which occurs on operating an adsorption chromatography column of the same dimensions which is packed with an adsorbent whose carrier is a granular activated carbon which contains the same inorganic precipitate as the adsorbent of the present invention and which consists of granules whose mean diameter is equal to the diameter of the spherical polymer-based activated carbon used in the adsorbent of the present invention.

DETAILED DESCRIPTION OF THE INVENTION

Figure 1:
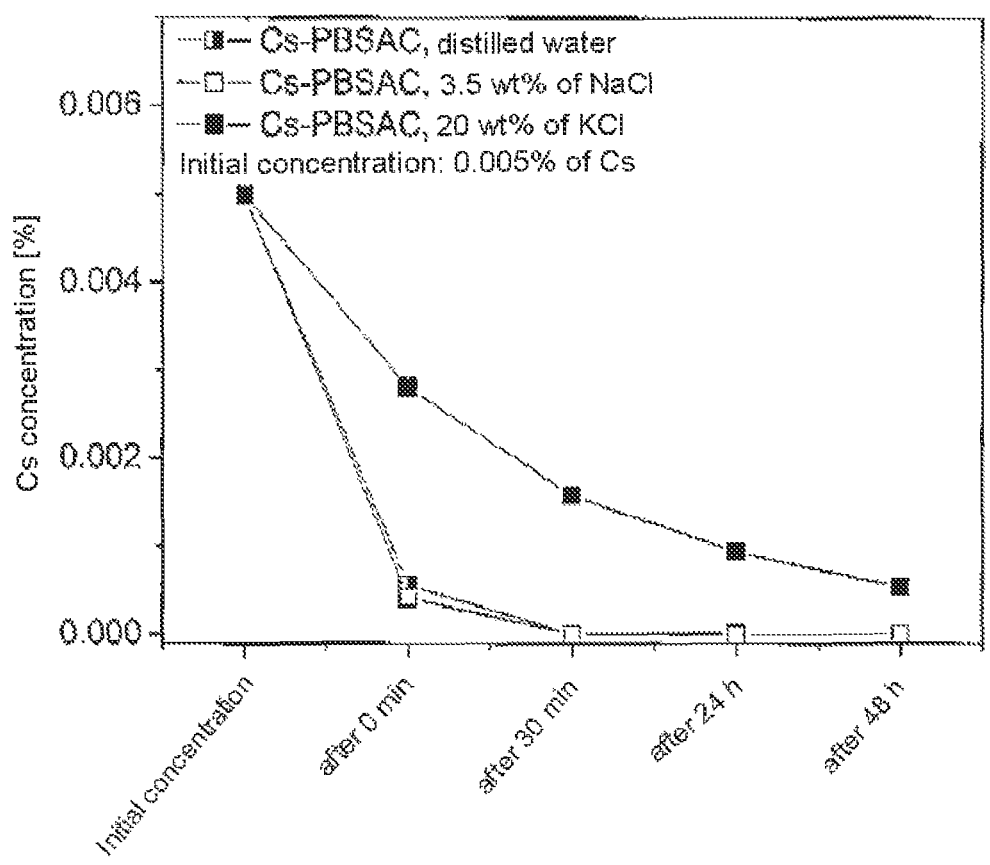
FIG. 1 provides the $Cs^+$ residual concentration in distilled water, distilled water additionally containing 3.5 wt. %, and water additionally containing 20 wt. % KCl as a function of time utilizing the adsorbent of Example 1.

In the context of the present invention, the expression "polymer-based spherical activated carbon" denotes a spherical activated carbon produced using a synthetic polymer. Preferred synthetic polymers are sulfonated styrene-divinylbenzene copolymers or sulfonated divinylbenzene-crosslinked polystyrenes. The aforementioned synthetic polymers and their processing into a polymer-based spherical activated carbon are described in EP 1 918 022 A1 and DE 101 91 656 B4.

In a preferred embodiment of the carrier-precipitated adsorbent according to the present invention, the polymer-based spherical activated carbon is a porous activated carbon having pores with a minimum average pore diameter of not less than 5 Å, preferably of not less than 10 Å and more preferably of not less than 15 Å. The average pore diameter $d_{ave}$ can be computed from the specific surface area SA and the adsorbed volume $v_{total}$ (for completely filled pores) as per $d_{ave} = 4 \times v_{total}/SA$.

In a further preferred embodiment of the carrier-precipitated adsorbent according to the present invention, the polymer-based spherical activated carbon has
  a Gurvich total pore volume of not less than 0.5 $cm^3/g$, with not less than 50%, preferably not less than 70%, of the total pore volume being formed by micropores having a pore diameter of not more than 20 Å,
  an average pore diameter of not more than 40 Å, and
  a BET surface area of not less than 1000 $m^2/g$.

The Gurvich determination of total pore volume is a measurement method known to one skilled in the art of adsorption technology. For further details concerning the Gurvich determination of total pore volume reference may be made to L. Gurvich (1915) J. Phys. Chem. Soc. Russ. 47 805 and also to S. Lowell et al., Characterization of Porous Solids and Powders: Surface Area Pore Size and Density, Kluwer Academic Publishers, Article Technology Series, pages 111 ff.

In the context of the present invention, the term "micropores" denotes pores having a diameter of up to 20 Å.

The average pore diameter is determined on the basis of the nitrogen isotherms in each case.

BET surface area is determined in accordance with ASTM D6558-04, the MultiPoint BET method of determination (MP BET) in a partial pressure range $p/p_0$ from 0.05 to 0.1 being employed in the present invention.

In a preferred embodiment of the carrier-precipitated adsorbent of the present invention, the polymer-based spherical activated carbon has a BET surface area in the range from 750 $m^2/g$ to 2500 $m^2/g$.

In a further preferred embodiment of the carrier-precipitated adsorbent of the present invention, the polymer-based spherical activated carbon has a BET surface area in the range from 1250 $m^2/g$ to 2000 $m^2/g$.

In a further preferred embodiment of the carrier-precipitated adsorbent of the present invention, the polymer-based spherical activated carbon has a BET surface area in the range from 1400 $m^2/g$ to 1900 $m^2/g$.

In a further preferred embodiment of the carrier-precipitated adsorbent of the present invention, the polymer-based spherical activated carbon has a BET surface area in the range from 1350 $m^2/g$ to 1750 $m^2/g$.

In a further preferred embodiment of the carrier-precipitated adsorbent according to the present invention, the polymer-based spherical activated carbon serving as the carrier is an oxidized carrier obtained by
  thermal oxidation, e.g., by exposing the carrier to an oxygen-containing gas, e.g., air, or
  chemical oxidation, e.g., by exposing the carrier to nitric acid, hydrogen peroxide or ammonium pyrosulfate or to ammonium peroxodisulfate.

Using an oxidized carrier enhances the wettability of the surface of the polymer-based spherical activated carbon, which in turn enhances the loadability of the carrier.

As far as further properties and the method of making the spherical activated carbon used in the carrier-precipitated adsorbent of the present invention are concerned, reference is made to EP 1 918 022 A1 and DE 101 91 656 B4.

In a preferred embodiment of the carrier-precipitated adsorbent according to the present invention, the adsorbent is an inorganic precipitate capable of adsorbing $Cs^+$ or $Ni^{2+}$ or a mixture of $Cs^+$ and $Ni^{2+}$ and the inorganic precipitate is a complex hexacyanoferrate(II) or a complex hexacyanoferrate (III). In the context of the present invention, the expressions "complex hexacyanoferrate(II)" and "complex hexacyanoferrate(III)" denote inorganic compounds which contain $[Fe^{II}(CN)_6]$ anions and $[Fe^{III}(CN)_6]$ anions, respectively, and two different cations in each case.

In a particularly preferred embodiment of the carrier-precipitated adsorbent according to the present invention, the complex hexacyanoferrate(II) and the complex hexacyanoferrate(III) each contain
(i) hexacyanoferrate(II) and hexacyanoferrate(III) anions, respectively,
(ii) $NH_4^+$, $Li^+$, $Na^+$, $K^+$ or $Rb^+$, and
(iii) a di-, tri- or tetravalent metal cation.

In a very particularly preferred embodiments of the carrier-precipitated adsorbent according to the present invention, the divalent metal cation is $Cd^{2+}$, $Co^{2+}$, $Cu^{2+}$, $Ni^{2+}$, $Zn^{2+}$, $Sn^{2+}$ or $Fe^{2+}$.

In a further very particularly preferred embodiment of the carrier-precipitated adsorbent according to the present invention, the trivalent metal cation is $Cr^{3+}$ or $Fe^{3+}$.

In a further very particularly preferred embodiment of the carrier-precipitated adsorbent according to the present invention, the tetravalent metal cation is $Sn^{4+}$, $Ti^{4+}$ or $Zr^{4+}$.

In the preferred embodiment of the carrier-precipitated adsorbent according to the present invention wherein the adsorbent is an inorganic precipitate capable of adsorbing $Cs^+$ or $Ni^{2+}$ or a mixture of $Cs^+$ and $Ni^{2+}$ and the inorganic precipitate is a complex hexacyanoferrate(II) or a complex hexacyanoferrate(III), the loading of the carrier-precipitated adsorbent according to the present invention with complex hexacyanoferrate(II) or with complex hexacyanoferrate(III) is preferably in the range from 0.1 wt % to 35 wt %, more preferably in the range from 5 wt % to 30 wt % and even more preferably in the range from 10 wt % to 25 wt %, where the wt % statements relate to the unloaded carrier.

In a further preferred embodiment of the carrier-precipitated adsorbent according to the present invention, the adsorbent is an inorganic precipitate capable of adsorbing $Sr^{2+}$, $La^{3+}$, $Co^{2+}$, $Ni^{2+}$, $Zr^{4+}$ or $Cs^+$ or a mixture of two or more of said cations and the inorganic precipitate is an alkaline earth metal oxide, wherein the alkaline earth metal oxide is preferably magnesium oxide, barium oxide, calcium oxide or strontium oxide. The alkaline earth metal oxide is precipitated on the polymer-based spherical activated carbon as follows: The polymer-based spherical activated carbon is impregnated with an aqueous solution of an alkaline earth metal(II) compound. The alkaline earth metal(II) compound can be a salt, for example an alkaline earth metal(II) chloride. Preferably the alkaline earth metal(II) chloride is magnesium chloride, barium chloride, calcium chloride or strontium chloride. The polymer-based spherical activated carbon impregnated as described above is admixed with a base, preferably with $NH_3$ or NaOH, dried and aftertreated under inert conditions, i.e., in the absence of oxygen, at 600-1000° C. The result is a polymer-based spherical activated carbon which is loaded with an alkaline earth metal oxide and wherein the degree of loading with the particular alkaline earth metal oxide is preferably in the range from 0.1 to 35 wt %, more preferably in the range from 5 wt % to 30 wt % and even more preferably in the range from 10 wt % to 25 wt %, the wt % statements relating to the unloaded carrier. The polymer-based spherical activated carbon loaded with an alkaline earth metal oxide contains said alkaline earth metal oxide not just on the outside surface, but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

In a further preferred embodiment of the carrier-precipitated adsorbent according to the present invention, the adsorbent is an inorganic precipitate capable of adsorbing $Sr^{2+}$, $La^{3+}$, $Co^{2+}$, $Ni^{2+}$, $Zr^{4+}$ or $Cs^+$ or a mixture of two or more of said cations and the inorganic precipitate is an alkali molybdatophosphate, preferably an ammonium molybdatophosphate, sodium molybdatophosphate, potassium molybdatophosphate or lithium molybdatophosphate.

A first method of precipitating the alkali molybdatophosphate on the polymer-based spherical activated carbon is carried out as follows: The polymer-based spherical activated carbon is impregnated with an aqueous solution of alkali metal molybdate, i.e., sodium molybdate, potassium molybdate or lithium molybdate, or with an aqueous solution of ammonium molybdate. The polymer-based spherical activated carbon impregnated as described above is admixed with a mixture that either consists of phosphoric acid and a water-soluble alkali metal compound, such as sodium chloride for example, or of phosphoric acid and a water-soluble ammonium compound, such as ammonium chloride for example. Alternatively, the polymer-based spherical activated carbon impregnated as described above is admixed with a mixture consisting of a water-soluble phosphate, for example sodium phosphate, and a water-soluble alkali metal/ammonium compound, the alkali metal compound used being, for example, sodium chloride and the ammonium compound used being, for example, ammonium chloride. This is followed by drying at 120-250° C.

A second method of precipitating the alkali molybdatophosphate on the polymer-based spherical activated carbon is carried out as follows: The polymer-based spherical activated carbon is impregnated with molybdatophosphoric acid. The polymer-based spherical activated carbon impregnated as described above is admixed with an aqueous alkali metal or ammonium chloride solution, the alkali metal chloride solution used being, for example, sodium chloride. This is followed by drying at 120-250° C.

Both the first method and the second method result in a polymer-based spherical activated carbon wherein the degree of loading with the particular alkali molybdatophosphate is preferably in the range from 0.1 to 35 wt %, more preferably in the range from 5 wt % to 30 wt % and even more preferably in the range from 10 wt % to 25 wt %, the wt % statements relating to the unloaded carrier. The polymer-based spherical activated carbon loaded with an alkali molybdatophosphate contains said alkali molybdatophosphate not just on the outside surface, but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

In a further preferred embodiment of the carrier-precipitated adsorbent according to the present invention, the adsorbent is an inorganic precipitate capable of adsorbing $Sr^{2+}$ and the inorganic precipitate is a $TiO_2$, preferably a $ZrO_2$-modified $TiO_2$. The precipitation of the preferably $ZrO_2$-modified $TiO_2$ on the polymer-based spherical activated carbon is carried out as follows: The polymer-based spherical activated carbon is impregnated with an aqueous solution of titanyl sulfate or of some other water-soluble titanium compound, e.g., titanyl chloride, and preferably in addition with zirconyl chloride or some other water-soluble zirconium compound, e.g., zirconyl sulfate. In the preferred embodiment, in which a $ZrO_2$-modified $TiO_2$ is prepared, it is preferable to use from 0.1 to 0.5 mol of Zr per mole of Ti. The polymer-based spherical activated carbon impregnated as described above is admixed with a base, for example with an aqueous solution of $NH_3$ or NaOH. This is followed by drying and aftertreatment under inert conditions, i.e., in the absence of oxygen, at 600-1000° C. The result is a polymer-based spherical activated carbon which is modified with an optionally $ZrO_2$-modified $TiO_2$ and wherein the degree of loading of the polymer-based spherical activated carbon with optionally $ZrO_2$-modified $TiO_2$ is preferably in the range from 0.1 to 35 wt %, more preferably in the range from 5 wt % to 30 wt % and even more preferably in the range from 10 wt % to 25 wt %, the wt % statements relating to the unloaded carrier. The polymer-based spherical activated carbon loaded with a $TiO_2$, preferably with a $ZrO_2$-modified $TiO_2$ contains said $TiO_2$ or said $ZrO_2$-modified $TiO_2$ not just on the outside surface, but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

In a further preferred embodiment of the carrier-precipitated adsorbent according to the present invention, the adsorbent is an inorganic precipitate capable of adsorbing $Sr^{2+}$ and the inorganic precipitate is an alkaline earth metal titanate, preferably a barium titanate, strontium titanate or calcium titanate. The alkaline earth metal titanate is precipitated on the polymer-based spherical activated carbon as follows: The polymer-based spherical activated carbon is impregnated with an aqueous solution of titanyl sulfate or of some other water-soluble titanium compound. The polymer-based spherical activated carbon impregnated as described above is first admixed with an aqueous solution of an alkaline earth metal(II) chloride, e.g., barium(II) chloride, strontium(II) chloride or calcium(II) chloride or of some other water-soluble alkaline earth metal compound, e.g., of the aforementioned alkaline earth metals, and thereafter with a base, for example with an aqueous solution of $NH_3$ or NaOH. This is followed by drying and thermal aftertreatment under inert conditions, i.e., in the absence of oxygen, at 800-1000° C. The result is a polymer-based spherical activated carbon wherein the degree of loading with the particular alkaline earth metal titanate is preferably in the range from 0.1 to 35 wt %, more preferably in the range from 5 wt % to 30 wt % and even more preferably in the range from 10 wt % to 25 wt %, the wt % statements relating to the unloaded carrier. The polymer-based spherical activated carbon loaded with an alkaline earth metal titanate contains said alkaline earth metal titanate not just on the outside surface, but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

In a further preferred embodiment of the carrier-precipitated adsorbent according to the present invention, the adsorbent is an inorganic precipitate capable of adsorbing $Sr^{2+}$ or $Cs^+$ or a mixture of $Sr^{2+}$ and $Cs^+$ and the inorganic precipitate is a transition metal phosphate, preferably a manganese phosphate, zirconium phosphate, iron(II) phosphate, iron(III) phosphate or nickel phosphate. The transition metal phosphate is precipitated on the polymer-based spherical activated carbon as follows: The polymer-based spherical activated carbon is impregnated with a water-soluble transition metal compound, for example with iron(II) chloride, iron(III) chloride or nickel chloride. The polymer-based spherical activated carbon impregnated as described above is admixed with phosphoric acid or with a water-soluble phosphate, for example sodium phosphate. This is followed by drying at 120° C. and thermal aftertreatment under inert conditions, i.e., in the absence of oxygen, at 200-800° C. The result is a polymer-based spherical activated carbon wherein the degree of loading with the particular transition metal phosphate is preferably in the range from 0.1 to 35 wt %, more preferably in the range from 5 wt % to 30 wt % and even more preferably in the range from 10 wt % to 25 wt %, the wt % statements relating to the unloaded carrier. The polymer-based spherical activated carbon loaded with a transition metal phosphate contains said transition metal phosphate not just on the outside surface, but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

The problem defined at the beginning is further solved by a method of producing an adsorbent precipitated on a carrier, which method comprises precipitating an inorganic adsorbent capable of $Cs^+$ adsorption from a liquid medium onto a polymer-based spherical activated carbon serving as the carrier.

In the method of the present invention, the term "polymer-based spherical activated carbon" denotes mutatis mutandis the same as already elucidated in connection with the description of the carrier-precipitated adsorbent of the present invention.

A preferred embodiment (A) of the method according to the present invention comprises the steps of
a) providing a polymer-based spherical activated carbon as the carrier,
b) impregnating the carrier with an aqueous solution containing
   (i) hexacyanoferrate(II) or hexacyanoferrate(III) anions, and
   (ii) $NH_4^+$, $Li^+$, $Na^+$, $K^+$ or $Rb^+$,
c) admixing the impregnated carrier with an aqueous solution of a salt of a di-, tri- or tetravalent metal cation to obtain the carrier-precipitated inorganic adsorbent in the form of a complex hexacyanoferrate(II) or a complex hexacyanoferrate(III),
d) washing the carrier containing the precipitated adsorbent, and
e) optionally drying the washed carrier containing the precipitated adsorbent.

The polymer-based spherical activated carbon can be used in step a) of the preferred embodiment (A) of the method according to the present invention in the as-supplied form, i.e., dry.

The concentration of the aqueous solution used in step b) of the preferred embodiment (A) of the method according to the present invention is preferably in the range from 0.01 mol/l to 0.8 mol/l and more preferably in the range from 0.1 mol/l to 0.5 mol/l.

Impregnating the carrier in step b) of the preferred embodiment (A) of the method according to the present invention with the solution used in step b) may be effected for example by
  drenching the carrier with an excess of impregnating solution, the amount of impregnation solution added being at least sufficient to form a stirrable dispersion, or
  drenching the carrier with the impregnating solution to the point of incipient wetness on the outside surface of the carrier, or
  spraying the carrier with the impregnating solution at the start.

The concentration of the aqueous solution used in step c) of the preferred embodiment (A) of the method according to the present invention is preferably in the range from 0.01 mol/l to 2 mol/l and more preferably in the range from 0.2 mol/l to 0.4 mol/l.

Admixing the impregnated carrier resulting from step b) in step c) of the preferred embodiment (A) of the method according to the present invention with the solution used in step c) can be effected by stirring or shaking the solution containing the impregnated carrier.

Admixing the impregnated carrier resulting from step b) in step c) of the preferred embodiment (A) of the method according to the present invention with the solution used in step c) may further be effected for example by
  drenching the impregnated carrier with an excess of the solution used in step c), the amount of the impregnation solution added being at least sufficient to form a stirrable dispersion, or
  drenching the impregnated carrier with the solution used in step c) to the point of incipient wetness on the outside of the carrier, or
  spraying the impregnated carrier with the solution used in step c).

Admixing the impregnated carrier resulting from step b) in step c) of the preferred embodiment (A) of the method according to the present invention with the solution used in step c) can further be carried out at elevated temperature, for example at a temperature in the range from 30 to 100° C., in which case the elevated temperature is preferably maintained for a period ranging from 2 to 12 hours.

Washing the adsorbent containing the precipitated adsorbent in step d) of the preferred embodiment (A) of the method according to the present invention is preferably effected with distilled water.

Washing the adsorbent containing the precipitated adsorbent in step d) of the preferred embodiment (A) of the method according to the present invention is preferably effected until resultant fines of the precipitate on the outer surface of the polymer-based spherical activated carbon have been removed, i.e., until the wash liquor is free from gravimetrically determinable fines.

The washed carrier resulting from step d), which contains the precipitated adsorbent, can be used undried for adsorbing $Cs^+$, in particular radiotoxic $^{137}Cs^+$.

The optional drying of the washed carrier containing the precipitated adsorbent in step e) of the preferred embodiment (A) of the method according to the present invention preferably takes place in air at a drying temperature which is preferably in the range from 90° C. to 120° C. and more preferably in the range from 90° C. to 110° C. The drying described in the examples of the present invention is carried out in order that the degree of loading of the carrier may be determined.

A further preferred embodiment (B) of the method according to the present invention comprises the steps of
a) providing a polymer-based spherical activated carbon as the carrier,
b) impregnating the carrier with an aqueous solution of a salt of a di-, tri- or tetravalent metal cation
c) admixing the impregnated carrier with an aqueous solution containing
  (i) hexacyanoferrate(II) or hexacyanoferrate(III) anions, and
  (ii) $NH_4^+$, $Li^+$, $Na^+$, $K^+$ or $Rb^+$, to obtain the carrier-precipitated inorganic adsorbent in the form of a complex hexacyanoferrate(II) or a complex hexacyanoferrate (III),
d) washing the carrier containing the precipitated adsorbent, and
e) optionally drying the washed carrier containing the precipitated adsorbent.

The only difference between embodiment (B) and embodiment (A) is the order in which the aqueous solution of hexacyanoferrate(II) or hexacyanoferrate(III) anions and $NH_4^+$, $Li^+$, $Na^+$, $K^+$ or $Rb^+$ and the aqueous solution of a salt of a di-, tri- or tetravalent metal cation are used. Therefore, the preferred parameter ranges of embodiment (B) are mutatis mutandis subject to the same remarks already made to describe embodiment (A).

The expressions "complex hexacyanoferrate(II)" and "complex hexacyanoferrate(III)" in the abovementioned preferred embodiments (A) and (B) of the method according to the present invention have mutatis mutandis the same meaning as already explained in connection with the description of the carrier-precipitated adsorbent of the present invention.

Both the abovementioned preferred embodiments (A) and (B) of the method according to the present invention make it possible to deposit the inorganic precipitate not just on the outer surface but also on the surface of the pores in the interior of the polymer-based spherical activated carbon in the form of nanoscale crystallites. The nanoscale crystallites are disposed in granule form on the outside surface and the pore inside surface area of the polymer-based spherical activated carbon and have a diameter in the interior of the carrier material which is at most in the region of the pore diameters of the polymer-based spherical activated carbon.

The processes described in the preferred embodiments (A) and (B) of the method according to the present invention deposit the inorganic adsorbent in the form of a complex hexacyanoferrate(II) or of a complex hexacyanoferrate(III) on and in the carrier of polymer-based spherical activated carbon in an elution-stable manner. "Deposited in an elution-stable manner" in the context of the present invention is to be understood as meaning that no gravimetrically measurable weight loss of complex hexacyanoferrate(II)/(III) occurs when a solution of the $Cs^+$ ions to be adsorbed flows around the polymer-based spherical activated carbon containing the complex hexacyanoferrate(II)/(III).

The elution-stable deposition of the complex hexacyanoferrate(II)/(III) on the carrier used according to the present invention is surprising. This is because unlike a carrier whose surface displays
  a multiplicity of quaternary ammonium groups, like the carrier described at the beginning of DE 40 21 046 A1, or a multiplicity of purely inorganic ions, like the carrier described at the beginning in U.S. Pat. No. 4,448,711, the carrier used in the method of the present invention does not, in its most general embodiment of polymer-based spherical activated carbon, possess any of the abovementioned ionic groups nor any other chemical functionalities whereby the complex hexacyanoferrate(II)/(III) precipitated on the surface of the carrier might become attached in or on the carrier in a stable manner via an ionic or some other chemical bond.

The method of the present invention makes it possible to adjust the degree of loading of the carrier-precipitated adsorbent of the present invention with complex hexacyanoferrate (II) or with complex hexacyanoferrate(III) within wide limits, although it is preferable to set a 0.1 wt % to 35 wt % degree of loading, more preferably a 5 wt % to 30 wt % degree of loading and even more preferably a 10 wt % to 25 wt % degree of loading. The wt % statements here relate to the unloaded carrier.

The present invention further provides a method of using the carrier-precipitated adsorbent of the present invention for removing a metal cation or a mixture of metal cations from water.

A preferred embodiment of the use method according to the present invention consists in removing radiotoxic metal cations, such as $^{137}Cs^+$, $^{83}Ni^{2+}$, $^{90}Sr^{2+}$, $^{140}La^{3+}$, $^{60}Co^{2+}$ or $^{89}Zr^{4+}$, from water which is contaminated with said radiotoxic metal cations and which contains one or more of said radiotoxic metal cations.

The present invention further provides a method of using the carrier-precipitated adsorbent resulting from the method of the present invention for removing $Cs^+$ from the $Cs^+$-containing water, in particular from water contaminated with radiotoxic $^{137}Cs^+$.

The examples which follow illustrate the invention.

EXAMPLE 1

Precipitation of Zinc Hexacyanoferrate(II) on a Polymer-Based Spherical Activated Carbon 1000 g of a polymer-based spherical activated carbon having an abrasion resistance of 99%, a BET surface area of 1938 m²/g, an average pore diameter of 25 Å and a Gurvich total pore volume of 1.224 cm³/g are admixed with 1.5 liters of a solution of 0.8 M $K_4[Fe(CN)_6].3H_2O$ and shaken on a shaking plate for 2 h. Thereafter, the excess $K_4[Fe(CN)_6].3H_2O$ solution is decanted off and the polymer-based spherical activated carbon impregnated with $K_4[Fe(CN)_6].3H_2O$ is dried at 110° C. for 6 h. The dried $K_4[Fe(CN)_6].3H_2O$-impregnated polymer-based spherical activated carbon is admixed with a solution of 153 g of $Zn(NO_3)_2.6H_2O$ in 1.5 liters of distilled water. The mixture obtained is shaken on a shaker plate under refluxing conditions at a temperature of 100° C. for 4 h. Thereafter, excess $Zn(NO_3)_2.6H_2O$ solution is decanted off, the polymer-based spherical activated carbon loaded with zinc hexacyanoferrate(II) precipitate is transferred into a frit having a nominal pore size of 100-160 μm (port 1 frit), washed with 5 liters of distilled water and dried at 110° C. for 6 h. The loading with zinc hexacyanoferrate(II) precipitate is 22 wt % based on the unloaded carrier.

EXAMPLE 2

Precipitation of Cobalt Hexacyanoferrate(II) on a Polymer-Based Spherical Activated Carbon Example 2 is carried out in the same way as Example 1 except that $Co(NO_3)_2.6H_2O$ is used instead of $Zn(NO_3)_2.6H_2O$. The loading with cobalt hexacyanoferrate(II) precipitate is 19 wt % based on the unloaded carrier.

EXAMPLE 3

Precipitation of Nickel Hexacyanoferrate(II) on a Polymer-Based Spherical Activated Carbon Example 3 is carried out in the same way as Example 1 except that $Ni(NO_3)_2.6H_2O$ is used instead of $Zn(NO_3)_2.6H_2O$. The loading with nickel hexacyanoferrate(II) precipitate is 13 wt % based on the unloaded carrier.

EXAMPLE 4

$Cs^+$ Adsorption Test with the Adsorbent of Example 1

10 g of the polymer-based spherical activated carbon obtained in Example 1 with a loading of zinc hexacyanoferrate(II) precipitate are slurried up with 100 ml of a solution containing 0.005 wt % of $Cs^+$ by stirring. The $Cs^+$ is used as $CsNO_3$. Atomic emission spectroscopy (ICP=Inductive Coupled Plasma) is used on the stirred slurry to determine at certain time intervals the particular $Cs^+$ residual concentrations remaining in the $Cs^+$-containing solution.

The results of the adsorption test are shown in FIG. 1. FIG. 1 shows the $Cs^+$ residual concentration in
   distilled water (black/white squares),
   distilled water additionally containing 3.5 wt % of NaCl (white squares), and
   water which additionally contains 20 wt % of KCl as a function of the adsorption time in minutes. The initial concentration of the $Cs^+$ is 0.005 wt %. "PBSAC" denotes "Polymer Based Surface Activated Carbon", which is supposed to refer to the adsorbent obtained in Example 1.

FIG. 1 shows that after just 0 minutes, i.e., right at the start of the adsorption test, the $Cs^+$ concentration sinks
   to about ¹⁄₁₀ in distilled water and in distilled water additionally containing 3.5 wt % of NaCl, and
   to about half the initial concentration in distilled water which additionally contains 20 wt % of KCl.

The further time course of the $Cs^+$ concentration in FIG. 1 is a clear indication that complete removal of the $Cs^+$ from $Cs^+$-containing water is possible even in the $Cs^+$ solution which additionally contains 20 wt % of KCl.

EXAMPLE 5

$Cs^+$ Adsorption Test with the Adsorbent of Example 3

Example 5 was carried out in the same way as Example 4 except that the polymer-based spherical activated carbon of Example 3, loaded with nickel hexacyanoferrate(II) precipitate, was used and the initial $Cs^+$ concentration was 0.0045 wt %.

Figure 2:
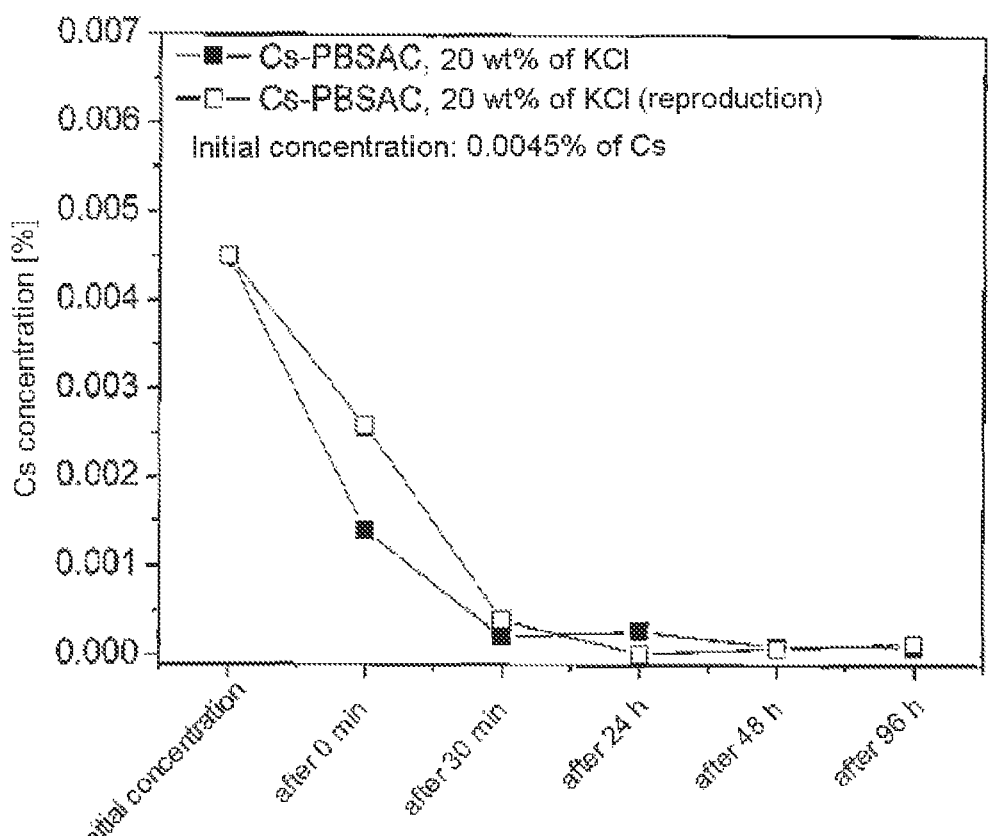
FIG. 2 provides the two measurements of $Cs^+$ residual concentration in water which additionally contains 20 wt % of KCl utilizing the adsorbent of Example 3.

The results of the adsorption test are depicted in FIG. 2. The black squares in FIG. 2 shows the $Cs^+$ concentration in water which additionally contains 20 wt % of KCl. The white squares in FIG. 2 represent the $Cs^+$ concentrations in water of an adsorption test which was repeated under the same conditions as the test just described. FIG. 2 shows that the $Cs^+$ adsorption is reproducible.

The invention claimed is:

1. A method of producing an adsorbent precipitated on a support, which method comprises precipitating an inorganic adsorbent capable of $Cs^+$ adsorption from a liquid medium onto a polymer-based spherical activated carbon serving as the support,
wherein the polymer-based spherical activated carbon has been produced from a synthetic polymer and wherein the polymer-based spherical activated carbon has the following characteristics:
a Gurvich total pore volume of not less than 0.5 cm³/g, with not less than 50% of the total pore volume being formed by micropores having a pore diameter of not more than 20 Å,
an average pore diameter of not more than 40 Å, and
a BET surface area of not less than 1000 m²/g;
wherein the method comprises the following steps:
a) providing the polymer-based spherical activated carbon as the support;
then either steps b1) and c1):
b1) impregnating the support with an aqueous solution containing
(i) hexacyanoferrate(II) or hexacyano-ferrate(III) anions, and
(ii) $NH_4^+$, $Li^+$, $Na^+$, $K^+$ or $Rb^+$; then
c1) admixing the impregnated support with an aqueous solution of a salt of a di-, tri- or tetravalent metal cation,
so as to obtain the inorganic adsorbent in the form of a complexed hexacyanoferrate(II) or a complexed hexacyanoferrate(III) and precipitated on the support;
or alternatively steps b2) and c2):
b2) impregnating the support with an aqueous solution of a salt of a di-, tri- or tetravalent metal cation,
c2) admixing the impregnated support with an aqueous solution containing
(i) hexacyanoferrate(II) or hexacyano ferrate(III) anions, and
(ii) $NH_4^+$, $Li^+$, $Na^+$, $K^+$ or $Rb^+$; then
so as to obtain the inorganic adsorbent in the form of a complexed hexacyanoferrate(II) or a complexed hexacyanoferrate(III) and precipitated on the support;
then followed by:
d) washing the support containing the precipitated adsorbent,
e) drying the washed support resulting from step d) and containing the precipitated adsorbent.

2. The method as claimed in claim 1, wherein the polymer-based spherical activated carbon is a porous polymer-based activated carbon having pores with a minimum average pore diameter of not less than 5 Å.

3. The method as claimed in claim 1, wherein the divalent metal cation is $Cd^{2+}$, $Co^{2+}$, $Cu^{2+}$, $Ni^{2+}$, $Zn^{2+}$, $Sn^{2+}$ or $Fe^{2+}$.

4. The method as claimed in claim 1, wherein the trivalent metal cation is $Cr^{3+}$ or $Fe^{3+}$.

5. The method as claimed in claim 1, wherein the tetravalent metal cation is $Sn^{4+}$, $Ti^{4+}$ or $Zr^{4+}$.

6. A support-precipitated adsorbent obtained by a method as claimed in claim 1.

7. A method of removing a metal cation or a mixture of metal cations from water, wherein the metal cation or the mixture of metal cations is removed by the support-precipitated adsorbent as claimed in claim 6.

8. A method of removing $Cs^+$ from $Cs^+$-containing water, wherein $Cs^+$ is removed by the support-precipitated adsorbent as claimed in claim 6.

9. A method of producing an adsorbent precipitated on a support, which method comprises precipitating an inorganic adsorbent capable of $Cs^+$ adsorption from a liquid medium onto a polymer-based spherical activated carbon serving as the support,
wherein the polymer-based spherical activated carbon has been produced from a synthetic polymer and wherein the polymer-based spherical activated carbon has the following characteristics:
a Gurvich total pore volume of not less than 0.5 cm³/g, with not less than 50% of the total pore volume being formed by micropores having a pore diameter of not more than 20 Å,
an average pore diameter of not more than 40 Å, and
a BET surface area of not less than 1000 m²/g;
wherein the method comprises the following steps:
a) providing the polymer-based spherical activated carbon as the support;
then either steps b1) and c1):
b1) impregnating the support with an aqueous solution containing
(i) hexacyanoferrate(II) or hexacyano-ferrate(III) anions, and
(ii) $NH_4^+$, $Li^+$, $Na^+$, $K^+$ or $Rb^+$; then
c1) admixing the impregnated support with an aqueous solution of a salt of a di-, tri- or tetravalent metal cation,
so as to obtain the inorganic adsorbent in the form of a complexed hexacyanoferrate(II) or a complexed hexacyanoferrate(III) and precipitated on the support;
wherein the divalent metal cation is $Cd^{2+}$, $Co^{2+}$, $Cu^{2+}$, $Ni^{2+}$, $Zn^{2+}$, $Sn^{2+}$, or $Fe^{2+}$, wherein the trivalent metal cation is $Cr^{3+}$ or $Fe^{3+}$ and wherein the tetravalent metal cation is $Sn^{4+}$, $Ti^{4+}$, or $Zr^{4+}$;
or alternatively steps b2) and c2):
b2) impregnating the support with an aqueous solution of a salt of a di-, tri- or tetravalent metal cation,
c2) admixing the impregnated support with an aqueous solution containing
(i) hexacyanoferrate(II) or hexacyano ferrate(III) anions, and
(ii) $NH_4^+$, $Li^+$, $Na^+$, $K^+$ or $Rb^+$; then
so as to obtain the inorganic adsorbent in the form of a complexed hexacyanoferrate(II) or a complexed hexacyanoferrate(III) and precipitated on the support;
wherein the divalent metal cation is $Cd^{2+}$, $Co^{2+}$, $Cu^{2+}$, $Ni^{2+}$, $Zn^{2+}$, $Sn^{2+}$, or $Fe^{2+}$, wherein the trivalent metal cation is $Cr^{3+}$ or $Fe^{3+}$ and wherein the tetravalent metal cation is $Sn^{4+}$, $Ti^{4+}$, or $Zr^{4+}$;
then followed by:
d) washing the support containing the precipitated adsorbent,
e) drying the washed support resulting from step d) and containing the precipitated adsorbent.

* * * * *